(12) United States Patent
Kressmann

(10) Patent No.: US 6,818,867 B2
(45) Date of Patent: Nov. 16, 2004

(54) METHOD FOR HEATING LIQUID IN AN ELECTRIC KETTLE

(75) Inventor: Frank Kressmann, Eschborn (DE)

(73) Assignee: Braun GmbH, Kronberg ( * ) Notice: Subject to any disclaimer, the term of this patent is extended or adjusted under 35 U.S.C. 154(b) by 0 days.

(21) Appl. No.: 10/732,875

(22) Filed: Dec. 9, 2003

(65) Prior Publication Data

US 2004/0149729 A1 Aug. 5, 2004

Related U.S. Application Data

(63) Continuation of application No. PCT/EP02/05439, filed on May 17, 2002, and a continuation of application No. PCT/EP02/05440, filed on May 17, 2002.

(30) Foreign Application Priority Data

Jun. 9, 2001 (DE) .......................... 101 28 058
Aug. 4, 2001 (DE) .......................... 101 38 455

(51) Int. Cl.[7] .......................... A47J 27/21; A47J 27/62; H05B 1/02
(52) U.S. Cl. ................ 219/441; 219/438; 219/492; 219/494; 219/497; 99/333
(58) Field of Search .............................. 219/438, 441, 219/492, 494, 497, 510; 99/333

(56) References Cited

U.S. PATENT DOCUMENTS 4,587,406 A    5/1986    Andre
4,803,344 A    2/1989    Wolf et al.
4,962,299 A   10/1990    Duborper et al.
5,639,023 A    6/1997    Hild et al.
6,084,216 A    7/2000    Slegt et al.
6,300,606 B1  10/2001    Engelmann et al.

FOREIGN PATENT DOCUMENTS

| | | |
|---|---|---|
| DE | 19711291 | 9/1998 |
| DE | 19813550 | 9/1999 |
| DE | 19821439 | 11/1999 |
| DE | 19907129 | 8/2000 |
| EP | 0 380 369 | 1/1990 |
| GB | 2 191 024 | 12/1987 |
| JP | 03001824 | 1/1991 |
| JP | 08107824 | 4/1996 |
| JP | 09148062 A * | 6/1997 |
| JP | 10257968 | 9/1998 |
| WO | WO 01/56436 | 8/2001 |

\* cited by examiner

*Primary Examiner*—Joseph Pelham
(74) *Attorney, Agent, or Firm*—Fish & Richardson P.C.

(57) ABSTRACT

A method of heating water in an electric kettle including determining the temperature differential between a measured starting temperature and a preselected target temperature. If the determined temperature differential is equal to a reference temperature differential, then the kettle is heated at less than full power for a calculated period of time. If, on the other hand, the determined temperature differential is greater than the reference temperature differential, then the kettle is heated until the kettle temperature reaches a determined end temperature.

40 Claims, 6 Drawing Sheets

METHOD FOR HEATING LIQUID IN AN ELECTRIC KETTLE

CROSS-REFERENCE TO RELATED APPLICATIONS

This application is a continuation of PCT applications PCT/EP02/05439 and PCT/EP02/05440, both filed May 17, 2002, and claims priority under 35 U.S.C. § 119(a) from German patent applications 101 28 028.0, filed Jun. 9, 2001 and 101 38 455.6, filed Aug. 4, 2001.

TECHNICAL FIELD

The present invention relates to methods and apparatuses for heating liquid in an electric kettle.

BACKGROUND

Electric kettles have long been used to heat liquids such as water. Generally, electric kettles include a temperature sensor to measure the temperature of the liquid being heated. Many kettles include a time sensor as well.

It is often possible to determine when the liquid contained in the kettle has reached its boiling point by comparing temperature and time measurements. More specifically, when the temperature of the liquid being heated ceases to change with respect to time, it can be deduced that the liquid's boiling point has been reached. This is because liquid generally cannot be heated to a temperature above its boiling point. Upon reaching the boiling point, a phase transition takes place and all energy is utilized to convert the liquid into gas rather than to heat the liquid. A method of determining when a liquid has reached its boiling point, similar to the method discussed above, was disclosed in European patent application EP 0 380 369 A1, which is incorporated by reference herein.

Many electric kettles have been configured to regulate temperature of the liquids they contain. For example, European patent application EP 0 704 186 A1, incorporated by reference herein, discloses a method for regulating the water temperature in an electric kettle. The water is heated from an initial temperature to a high temperature (less than the boiling point). The remaining heating time required before the water reaches its boiling point is then determined as a function of temperature and time. More particularly, based on the heating time required for the liquid to be heated from its initial temperature to its high temperature, the amount of time required to heat the water from its high temperature to its boiling point can be deduced. Therefore, electric kettles of this sort heat liquid for a calculated amount of time, and then shut off.

In order to prevent overheating of the kettle itself, many electric kettles include overheating protection devices. For example, many kettles include fusible cutouts, bimetal sensors, and/or other mechanical sensors. Other kettles prevent overheating of the kettle by monitoring and regulating temperature of the kettle's heating element.

In European patent application EP 0 380 369 A1, a method is disclosed for detecting overheating of the kettle and preventing dry boiling, i.e., heating of an empty kettle. In order to detect and prevent overheating of the kettle, the temperature of the heating plate of the kettle is measured using a temperature sensor. An excessive increase in temperature of the heating plate is interpreted as a signal that the electric kettle contains too little liquid or no liquid at all. Upon reaching a temperature over a predetermined maximum limit, the kettle is shut off.

The apparatuses and methods discussed above occasionally fail due to defective or inaccurate sensors and/or poor positioning of sensors. Defective temperature sensors generally convey an erroneous temperature measurement. Even properly functioning temperature sensors frequently convey inaccurate temperature readings because they are positioned too far away from the source of heat. For example, according to EP 0 380 369 A1, a defined overtemperature must be reached before the electric kettle switches off. But, heating often takes place above this temperature because the respective temperature sensors are not arranged directly at the heating element. For this reason, an even higher temperature is present at the sensor, until the thermal gradient around the heating element has reached thermal equalization. Similarly, any safety switch-off by means of a fusible cutout only takes place if considerably more thermal energy is supplied to the system than would be supplied during operation at nominal rating.

As noted above, an erroneous temperature measurement may cause the functioning of the apparatuses to be altered earlier or later than desired. For example, upon detecting an erroneously low liquid temperature, the regulated kettle may be shut off too late causing the temperature of the liquid to exceed a desired temperature. Or, upon reading an erroneously low heat plate temperature, the kettle may be shut off too late causing the temperature of the kettle itself to exceed a desired maximum temperature limit. Similarly, erroneously high liquid temperature measurements or heat plate temperature measurements can cause the kettle to be shut off too early resulting in a liquid temperature that is less than the temperature desired.

SUMMARY

According to one aspect of the invention, during heating of a liquid, thermal overshoot resulting from deactivating a heating element too late is prevented. Furthermore, a time delay between the point in time when the heating is switched on and when a temperature increase at a sensor can be detected is taken into consideration. In spite of different fill quantities and different values for a difference between a target temperature and a starting temperature, it is possible to reproducibly achieve a preselected target temperature.

The preset target temperature may be below boiling temperature. This is the case for example if water or mineral water which has been boiled before is used for preparing baby food. Another example includes the preparation of green tea with water or mineral water that has been boiled before.

Precisely when using water which has been boiled before, very slight differences between the target temperature and the starting temperature may occur. Furthermore, this means that the starting temperature can be either above or below the ambient temperature.

If the water fill level is low and, thus, the heat capacity of the system is low, and if the temperature sensor responds relatively slowly, i.e. the delay time is relatively long, the temperature difference between the preselected target temperature and the start temperature that was measured may be insufficient for the heating process to be carried out at full heating output without overshoot occurring. In this case, the temperature difference is the minimum acceptable temperature difference or the reference temperature difference. In this case, a controlled heating process which is based on parameters obtained purely by calculation, at a reduced heating output, is carried out, and the controlled heating process is stopped after a precalculated period of time.

Otherwise, i.e. if the temperature difference between the preselected target temperature and the measured starting temperature is greater than the minimum acceptable temperature differential, a regulated heating process is carried out. This means that the temperature is picked up at the temperature sensor and is compared with the preselected target temperature. In this process, the inertia of the temperature sensor and the heat capacity of the system are taken into account in the calculations. When a final temperature, which is below the preset target temperature of the system, is reached at the temperature sensor, the heating process is ended.

As a result of the above, after temperature equalization in the system, the target temperature is achieved with accuracy in a predefined tolerance band, without overshoot. Consequently, the time required for preparing the water is clearly shortened. Furthermore, heating output and thus electrical energy is saved, which would otherwise unnecessarily be used in the heating process. By dividing the method into two alternative implementation procedures, namely one procedure with a small gap between the target temperature and the starting temperature, and one procedure with a bigger gap between the target temperature and the starting temperature, safe functioning even in boundary states is ensured.

In this aspect, a starting temperature is sensed by the temperature sensor, then a starting temperature differential between the sensed starting temperature and a preselected target temperature is determined. If the starting temperature differential is less than a reference temperature differential, then the kettle is heated at less than full power. And, if the starting temperature differential is greater than the reference temperature differential, then an end temperature is determined and the kettle is heated until the end temperature is sensed at the temperature sensor.

In another embodiment, the heat capacity of the system is determined. The heat capacity may be a function of a heating output in the form of electrical power supplied, a temperature difference, and a period of time. According to another embodiment, in order to determine the heat capacity, the heating element is subjected to heating output only for a short time, so that even in the case of the fill quantity being minimal, an end temperature is not yet reached. After a brief switch-on phase, the heating element is switched off for a predefined waiting time. The waiting time is selected such that the thermal equalization processes in the liquid have been completed.

Another embodiment describes a possible definition for the reference temperature differential. The reference temperature differential is a function of the heat capacity, an electrical heating output of the heating element, and a delay time. The delay time is the amount of time, after activating the heating element, that passes before a temperature increase is sensed at the temperature sensor. In another embodiment, the reference temperature differential is the product of the electrical heating output of the heating element, and the delay time, divided by the heat capacity. Alternatively, fixed limiting values for the reference temperature differential can also be specified.

Another embodiment takes into account thermal equalization processes in the system and the inertia of the temperature sensor. Thus, the end temperature is the final temperature measured at the temperature sensor, at which final temperature the heating process is ended by the electronic regulator. In another embodiment, the end temperature is less than the target temperature.

In another embodiment, a response triggering temperature is dependent on the sensitivity of the temperature sensor. In this context, the response triggering temperature refers to the first measurable temperature that measurably differs from the starting temperature. The response triggering temperature differential is the difference between the starting temperature and the response triggering temperature.

In another embodiment, it is possible for the gradient of the temperature curve to be interpolated in a linear way over time by dividing the start temperature differential into small increments.

In another embodiment, regulated heating is carried out when the starting temperature differential equals the reference temperature differential. In another embodiment, the regulated heating is carried out by means of electronic regulating. In one embodiment, the kettle is heated at less than full power for a calculated period of time. In another embodiment, the calculated period of time for which the kettle is heated is such that, upon a first measurable temperature increase, the temperature measured at the sensor is less than the end temperature. In another embodiment, the kettle is heated at less than full power by intermittently activating and deactivating the heating element. In yet another embodiment, the kettle is heated at full power when the heating element is activated and the kettle is not heated when the heating element is deactivated. In one embodiment, the heating element comprises multiple heating units and at least one of the heating units is deactivated when the kettle is heated at less than full power.

In another embodiment, the end temperature designates the actual temperature of the system that occurs in a predefined tolerance band around the target temperature.

In one embodiment, the kettle is constructed such that the delay time is about equal to the time difference between the liquid reaching the end temperature and the end temperature being sensed at the sensor.

In one embodiment, a sampling temperature differential is determined over a sampling period of time, which begins after the delay time. In another embodiment, a sampling period of time is variable. In this way the sampling rate is determined. In another embodiment, a temperature gradient is determined as a function of the sampling time period and the sampling temperature difference. In another embodiment, the end temperature is extrapolated from a temperature curve based on the sampling time and sampling temperature differential. In another embodiment, several gradient values are weighted and averaged.

Finally, in another embodiment, the end temperature is situated in a predetermined tolerance range around the target temperature. Furthermore, the end temperature, at which the heating process is ended by the electronic regulator, is determined. Extrapolation can, for example, take place in a linear way.

In one aspect, an electric kettle for heating a liquid includes a container defining a cavity for containing the liquid, a heating element that transmits heat to the liquid, a temperature sensor responsive to a kettle temperature, a time sensor, and a heating regulator. The heating regulator is configured to, upon activation of the kettle, sense a starting temperature measured by the temperature sensor, determine a starting temperature differential between the measured starting temperature and a preselected target temperature, heat the kettle at less than a full power level for a calculated period of time in response to the starting temperature differential being equal to a reference temperature differential, and determine an end temperature and heat the kettle until the determined end temperature is measured at the temperature sensor in response to the starting temperature differential being greater than the reference temperature differential. In one embodiment, the heating regulator is also configured to determine a heat capacity. In another embodiment, the heating regulator is further configured to determine a delay time. In yet another embodiment, the heating regulator includes multiple heating elements.

Another aspect makes it possible to detect and react to a malfunction of the heating element or regulator. By the incorporation of system knowledge, it is possible to detect in a targeted way any errors and failures in the overall system of the regulator and/or heating element. In this way a situation can be prevented where during a malfunction, temperatures in the device are reached where only fusible cutouts or similar can still respond.

In another embodiment, as a result of the adaptability of the regulator, or of characteristic data stored in a storage element respectively, changes in the system, which correspond to expectations, can be taken into account. This relates in particular to different ambient temperatures that influence the initial temperature of the liquid to be heated, to different air pressures that influences the boiling temperature, and the like. In this way, predetermined disturbance variables can be taken into account.

In a further advantageous embodiment of the invention, the influence of disturbance variables, which cannot be exactly quantified, are taken into account. Accordingly, continuous adaptation that lasts over the entire lifetime of the device to changes and wear that cannot be predetermined, such as calcium buildup, becomes possible.

In still another advantageous embodiment, any malfunction of the device that cannot be rectified by self-adjustment of the regulator, or of the respective regulating variables, is signaled to the user. In this arrangement, for example light-emitting diodes, beepers/buzzers, or similar can be used as signal generators.

In another embodiment, by additionally recording a fill level of the water to be heated in the electric kettle, the heating time can be checked by computation. Detection of the fill level can for example take place by simple floats or by more sophisticated sensor equipment. However, it is also possible, by measuring the heating speed of the system per unit of time, to determine the quantity of water in the electric kettle, and to provide this value to the electronic system for further processing.

In another aspect, detection of, and reaction to, any malfunction of the heating element or of the electronic control becomes possible easily and safely.

In another embodiment, blinking light-emitting diodes or a loud beeper or buzzer alarm, for example, draw the user's attention to the need for the device to be checked by a service technician.

In another embodiment, measuring the liquid level can, for example, take place mechanically by means of a float, or, as already described above. The measuring signal acquired in this way is then, for example, changed into an electrical signal by a potentiometer. After analog to digital conversion of the signal, the signal can be stored in the electronic memory.

In another embodiment, an additional sensor arrangement for measuring the ambient air pressure is provided in order to determine the respective boiling temperature and the boiling point in time at which boiling temperature is reached. A warm-up time for measuring an initial rise in temperature can also be matched to individual circumstances.

In another embodiment, by accommodating additional characteristic data it becomes possible to achieve smaller tolerances in calculated set point values. This contributes to lower energy consumption and, thus, to a more economical operation. Furthermore, for example, by a corresponding sensor arrangement, the water hardness can be determined, thus making it possible to draw conclusions concerning the calcium buildup in the device.

Finally, another embodiment prevents continued operation, over an extended period, of an electric kettle that is afflicted with serious malfunctions. In particular, non-approved manipulation of the electric kettle that, for example, serves the purpose of continuing to operate a defective electric kettle, can be prevented. Such device protection prevents the electric kettle from being switched on if a corresponding fault occurs particularly frequently. The device protection only permits continued operation if, during repair work, the error memory is reset by a service technician.

In one aspect, a method of detecting a malfunction in an electric kettle for heating a liquid includes sensing a starting temperature at the temperature sensor, activating the heating element for a selected length of time, sensing a second temperature at the temperature sensor at the end of the selected length of time, calculating a temperature differential as a difference between the starting temperature and the second temperature, and, in response to the calculated temperature differential being less than or equal to a reference temperature differential, deactivating the heating element.

In one embodiment, the method further comprises sensing a third temperature at the temperature sensor at a reference boiling time in response to the calculated temperature differential being greater than the reference temperature differential, deactivating the heating element in response to the third temperature being less than a reference boiling temperature, and deactivating the heating element in response to the third temperature being greater than or equal to the reference boiling temperature.

In a further embodiment the method includes determining the selected length of time, the reference temperature differential, the reference boiling time, and the reference boiling temperature as functions of an ambient temperature. In another embodiment, determining the selected length of time, the reference temperature differential, the reference boiling time, and the reference boiling temperature comprises accessing data of a characteristic data matrix stored in the electronic memory.

In another embodiment, the method includes indicating a malfunction to a user if the calculated temperature increase is less than or equal to the reference temperature increase and if the third temperature is less than the reference boiling temperature. In another embodiment, indicating the malfunction comprises activating an acoustic indicator.

In one embodiment, the method includes measuring a liquid fill level prior to activating the heating element. In another embodiment, the selected length of time, the reference temperature differential, the reference boiling time, and the reference boiling temperature are functions of the liquid fill level.

One embodiment includes modifying the data of the characteristic data matrix in response to the third temperature being greater than or equal to the reference boiling temperature. Another embodiment includes determining a power consumption of the heating element over time and a temperature gradient of the liquid over time.

In another embodiment, the method includes storing system errors, wherein, in response to the system errors occurring above a predetermined acceptable frequency, the heating element is deactivated until a memory is reset. In another embodiment, the system errors include calculating the temperature differential to be less than or equal to the reference temperature differential and sensing the third temperature to be less than the reference boiling temperature.

In another aspect, an electric kettle for heating a liquid includes a heating element that transmits heat to the liquid, a temperature sensor responsive to a kettle temperature, a time sensor, an electronic memory that stores characteristic data, and a heating regulator in communication with the memory.

In one embodiment, the heating regulator is configured to sense a starting temperature measured by the temperature sensor, activate the heating element for a selected length of time, sense a second temperature measured by the temperature sensor at the end of the selected length of time, calculate a temperature differential as a difference between the starting temperature and the second temperature, and deactivate the heating element in response to the calculated temperature differential being less than or equal to the reference temperature differential.

In another embodiment, heating regulator is further configured to sense a third temperature measured by the temperature sensor at a reference boiling time in response to the calculated temperature differential being greater than the reference temperature differential, deactivate the heating element in response to the third temperature being less than a reference boiling temperature, and deactivate the heating element in response to the third temperature being greater than or equal to the reference boiling temperature.

In another embodiment, the memory comprises a characteristic data matrix including data corresponding to the selected length of time data, the reference temperature differential, the reference boiling time, and the reference boiling temperature. In a further embodiment, the kettle further includes a microprocessor that updates the characteristic data in response to a system change. According to another embodiment, the system change is a decrease in heating output of the heating element.

In another embodiment, the electric kettle further includes an indicator to indicate a malfunction to a user. In a further embodiment, the indicator is an acoustic indicator.

In one embodiment, the electric kettle includes a liquid level sensor that measures a level of the liquid in the kettle.

In a further embodiment, the heating regulator is further configured to deactivate the heating element until the memory is reset in response to system errors occurring above a predetermined acceptable frequency.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
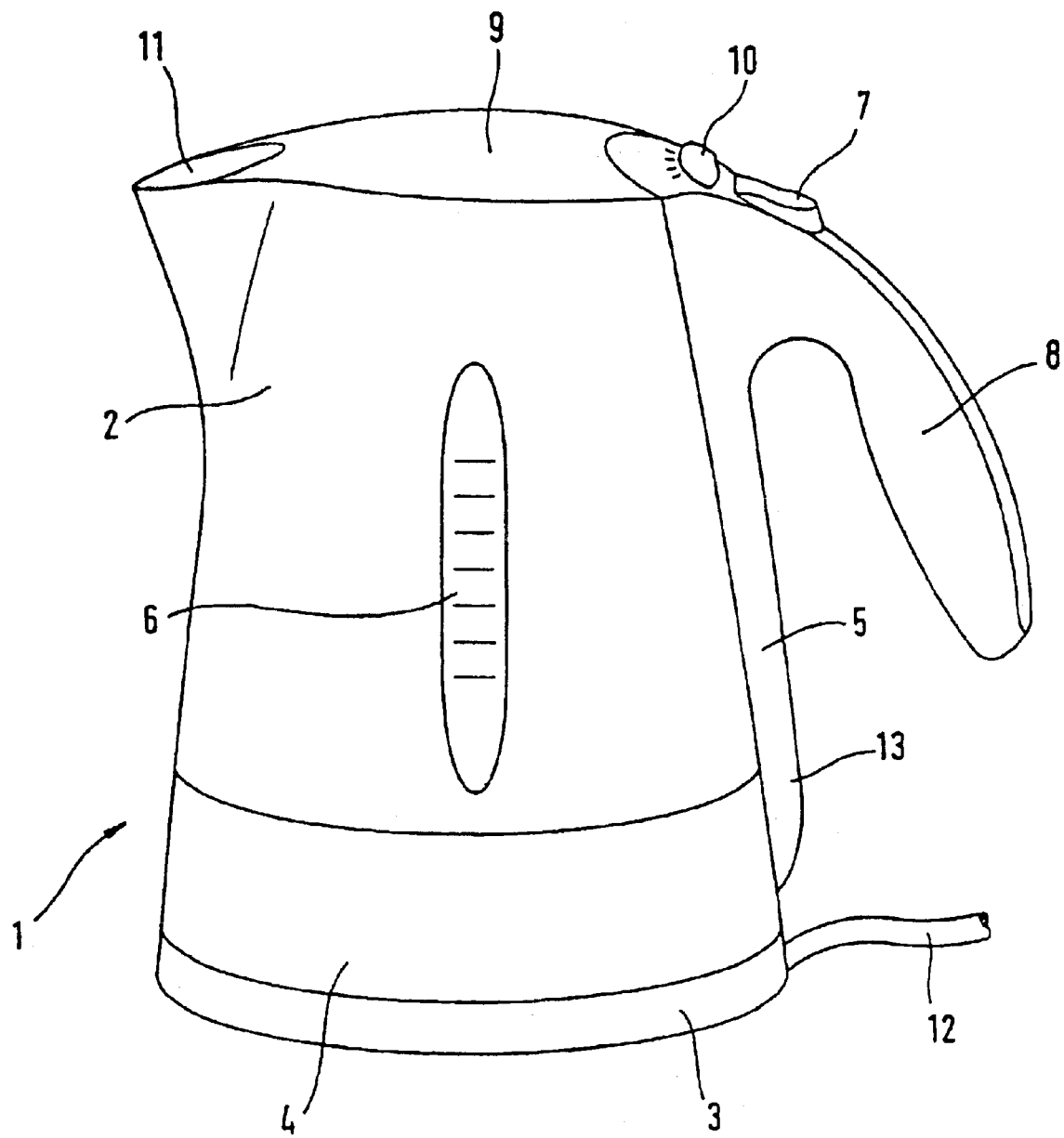
FIG. 1 is a perspective view of an electric kettle.

As shown in FIG. 1, an electric kettle 1 comprises a container 2, preferably made of a temperature-resistant thermoplastic material or of stainless steel. Underneath the container 2 there is an essentially cylindrical kettle substructure 4, which accommodates a heating element (not shown) comprising several heating units (not shown), and an electronic regulator (not shown).

Arranged on the underside of the kettle substructure 4 is a disc-shaped base plate 3. The base plate 3 comprises a power cord 12 and an induction coupling (not shown), arranged in the center of the base plate 3, for contactless current transmission. The electric kettle 1 is detachable from the base plate 3. The electric kettle 1 can be detached from the base plate 3 by lifting the electic kettle 1 away from the base plate 3 in an upward direction.

At an upper end of the electric kettle 1, which is in the shape of a slightly truncated cone, a cover 9 is arranged which on one side exposes a pouring spout 11 for pouring the liquid. Arranged on a side of the cover 9 opposite the pouring spout 11, is a selector switch 10 for manually preselecting a target temperature. An operator can select a target temperature indicated on a temperature scale by rotating the selector switch 10 to a desired position that corresponds to a desired temperature setting.

An on/off button 7 is arranged adjacent the selector switch 10. The on/off button 7 is used for activating and deactivating the heating element. For ease of operation with the use of the thumb of one hand, the on/off button 7 is ergonomically located at the top end of a handle 8 which is arranged on the side of the container 2.

The handle 8 is connected to an outside wall of the container 2 by an elongated shaft 13. The shaft 13 extends substantially along the entire height of the electric kettle 1, i.e. along the height of the container 2 and the kettle substructure 4. Furthermore, the shaft is used as a cable guide for electrical cables which connect the on/off button 7 and the selector switch 10 to the electronic regulator (not shown) in the kettle substructure 4.

A fill level indicator 6, made of transparent plastic, is positioned within a side of the container 2. The fill level indicator 6 extends along the longitudinal direction of the container 2, offset by approximately 90° in relation to the shaft 13. The fill level indicator 6 has horizontal lines for displaying the respective fill level of the liquid. In particular, a minimum and a maximum fill level are displayed on the fill level indicator 6.

A temperature sensor 5 is provided in the shaft 13 at a position below the minimum fill level. This ensures that the water temperature is correctly registered even at the minimum fill level. The temperature sensor measures the starting temperature of the liquid. The starting temperature typically corresponds to the ambient temperature. Subsequently, the temperature sensor measures the temperature of the liquid at various times throughout the heating process.

Figure 2:
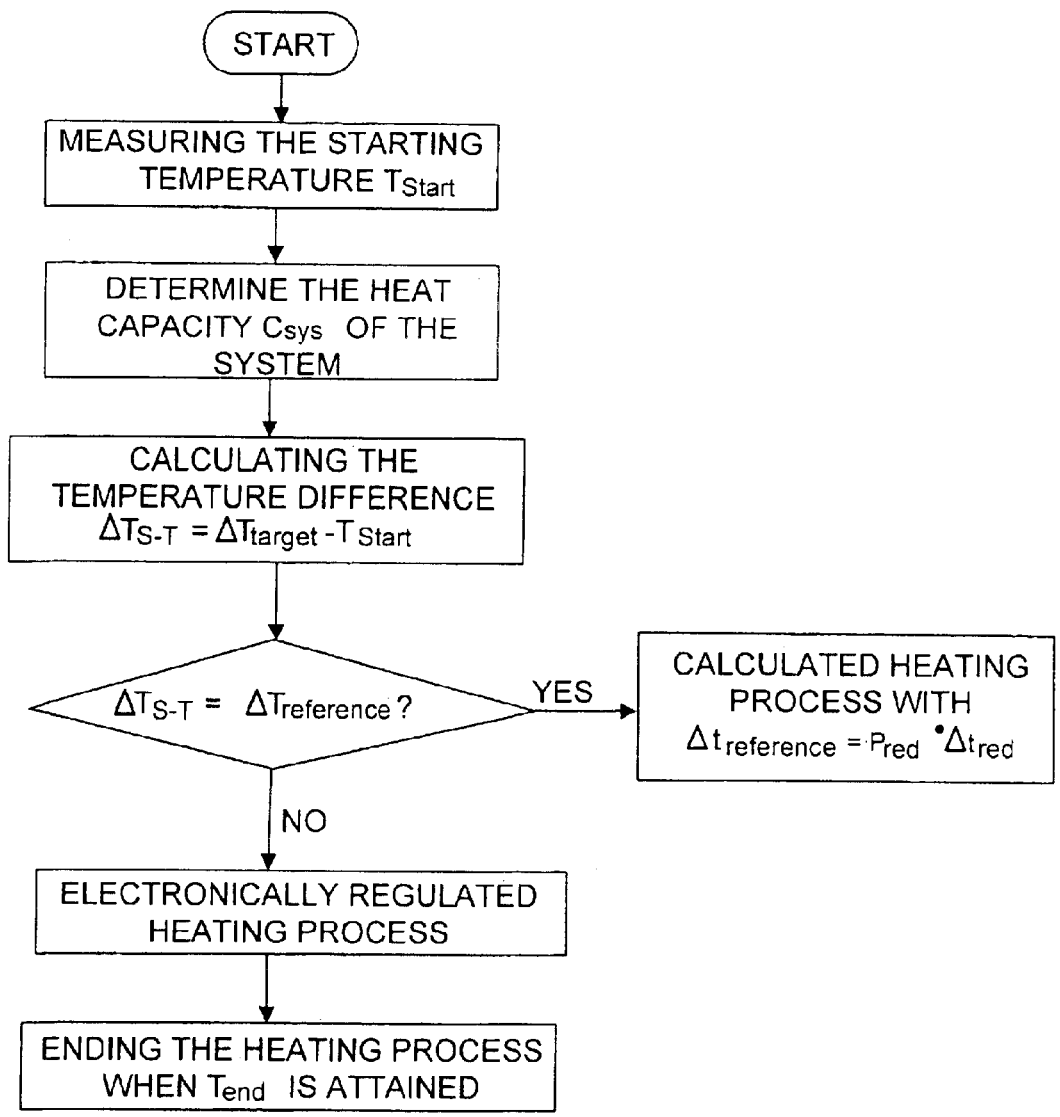
FIG. 2 is a flow chart diagrammatically showing a method for heating liquid in an electric kettle.

Referring to FIG. 2, after manually selecting a target temperature $T_{target}$, and after activating the heating element by switching the on/off button to the on position, the heating process takes place automatically, according to the following steps:

a) The starting temperature $T_{start}$ is measured. The starting temperature is measured by the temperature sensor, which is arranged in or on the container. The duration of time required for measuring the temperature depends on the sensitivity of the temperature sensor.

b) A heat capacity $C_{sys}$ is determined. In order to determine the heat capacity, the heating element is activated for a short period of time, then deactivated for a predefined waiting time $\Delta t_{wait}$. The heating element is subjected to heating output only for a short time, so that even in the case of the fill quantity being minimal, a desired end temperature $T_{end}$ is not yet reached. The waiting time $\Delta t_{wait}$ is sufficiently long to allow thermal equalization processes within the liquid to be completed. Finally, the heat capacity is calculated from the following equation: $C_{sys}=P_{el}\cdot\Delta t_{wait}/\Delta T$. In the above equation, $C_{sys}$ is the heat capacity, $P_{el}$ is the electrical heating output, $\Delta t_{wait}$ is the waiting time, and $\Delta T$ is the change in temperature over the waiting time.

c) A temperature differential $\Delta T_{s-t}$ between the preselected target temperature $T_{target}$ and the measured starting temperature $T_{start}$ is calculated.

The second and third steps may be reversed.

d) If the temperature differential $\Delta T_{s-t}$ is equal to a reference temperature differential $\Delta T_{reference}$, then the electric kettle is heated at reduced power $P_{red}$ for a calculated period of time $\Delta t_{red}$; and e) If the temperature differential $\Delta T_{s-t}$ is greater than the reference temperature differential $\Delta T_{reference}$, the electric kettle is heated in a regulated manner. The regulator calculates an end temperature $T_{end}$, and when the temperature sensor measures a temperature that is equal to the end temperature $T_{end}$, the heating process is terminated.

Figure 3:
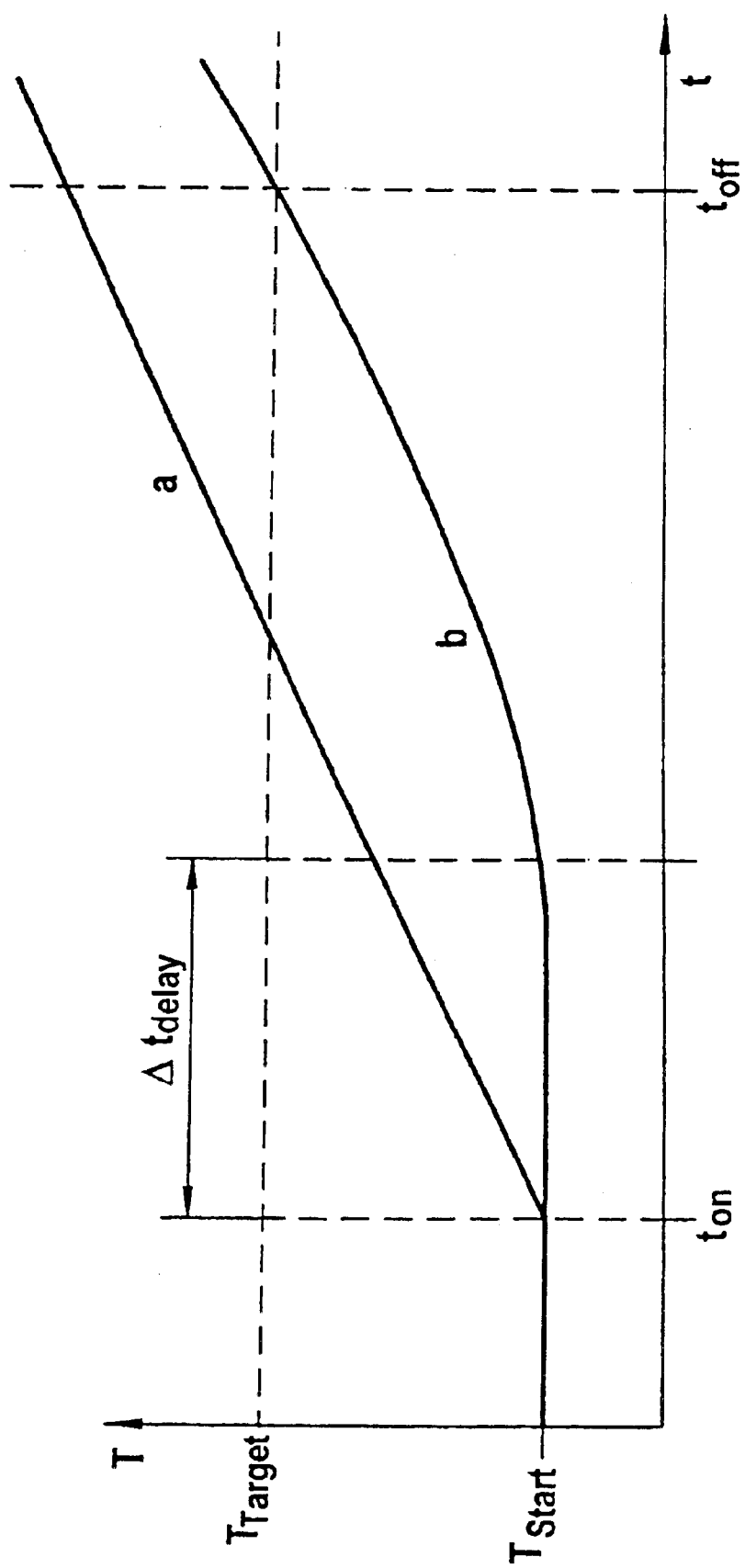
FIG. 3 is a diagram showing the typical gradient of the temperature T over a time span t in the heating process of an electric kettle.

FIG. 3 shows a diagram of a typical gradient of temperature T over time t in an electric kettle without the use of the method discussed above. The time t is projected on the horizontal axis, with the point in time when the electric kettle is activated being designated $t_{on}$, and the point in time when the electric kettle is deactivated being designated $t_{off}$. Projected on the vertical axis are temperatures and, in particular, the measured starting temperature $T_{start}$ and the selected target temperature $T_{target}$.

The actual temperature gradient in the electric kettle is designated curve a, while the temperature gradient measured at the temperature sensor is designated curve b. The temperature curves differ because the temperatures measured at the temperature sensor are only registered after a delay time $\Delta t_{delay}$. The delay time may be the result of the temperature sensor being positioned at a point remote from the source of heat and/or the sensor technology may simply be unable to measure and record a temperature immediately.

The actual temperature gradient, which is designated curve a, can be approximated by the following equation:

$$(T_{actual}-T_{start})=(P_{el}\cdot(t_{actual}-t_{on})/C_{sys})$$

In the above equation, $T_{actual}$ designates the actual temperature of the liquid in the container, $T_{start}$ designates the starting temperature of the liquid, $P_{el}$ designates the electrical heating output supplied by the heating element, $C_{sys}$ designates the heat capacity of the system, $t_{on}$ designates the point in time at which the appliance is activated, and $t_{actual}$ designates the point in time when the actual temperature $T_{actual}$ of the liquid is measured.

As a result of inertia in the system and inertia in the temperature sensor, the target temperature is measured with some delay. However, at the time when the measurement curve b intersects the line representing the target temperature $T_{target}$, the container 2 has in fact already received more energy than is required. In other words, the liquid actually reaches the target temperature $T_{target}$ before the temperature sensor measures the target temperature $T_{target}$. The system overshoots, as is illustrated by curve a.

Figure 4:
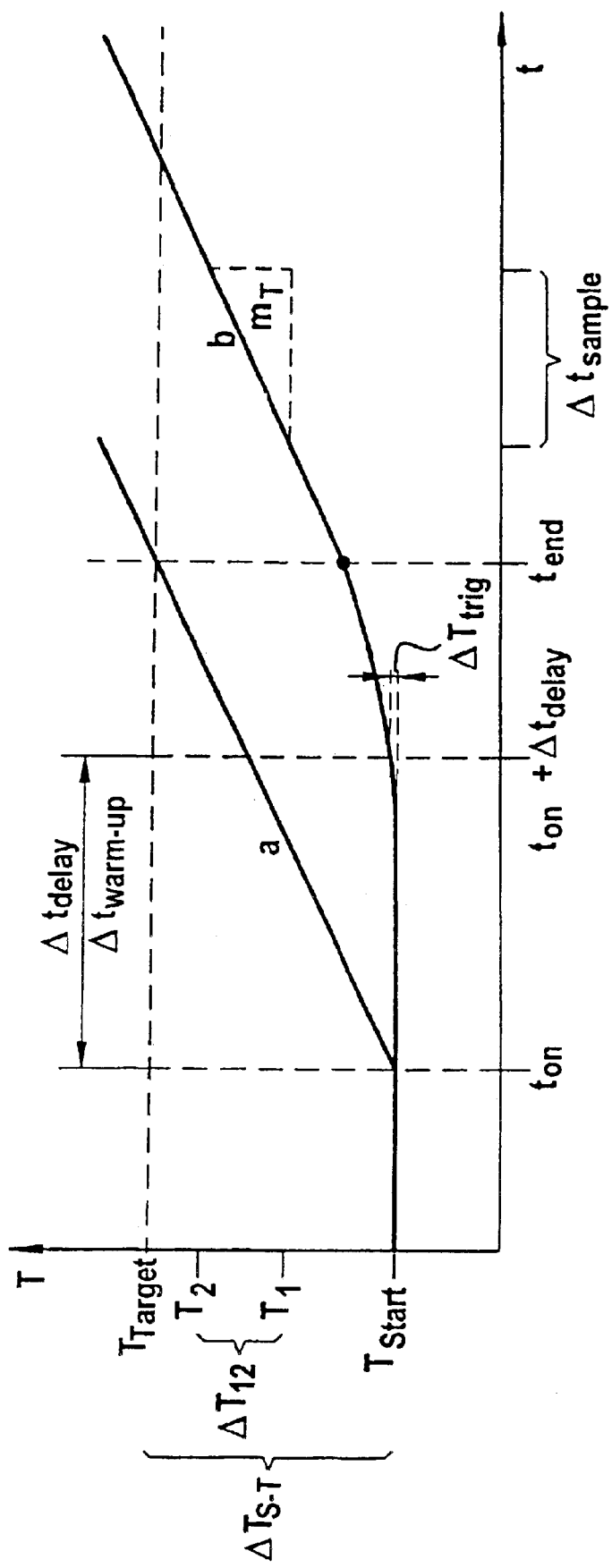
FIG. 4 is a diagram showing the gradient of temperature T over a timespan t in the heating process of an electric kettle to which a method for heating liquid in the electric kettle has been applied.

FIG. 4 shows a diagram which, by way of an example, shows the gradient of temperature T over time t in an electric kettle using the method discussed above.

Projected on the verical axis are temperatures T and, in particular, the measured starting temperature $T_{start}$ and the selected target temperature $T_{target}$. The temperature difference between the starting temperature $T_{start}$ and the selected target temperature $T_{target}$ is also shown on the vertical axis and is designated $\Delta T_{s-t}$.

The actual temperature gradient of the liquid in the electric kettle is plotted with respect to time on the graph and is designated a. The measured temperature gradient, as measured by the temperature sensor, is plotted on the graph and designated curve b.

A span of warm-up time $\Delta t_{warm-up}$ is the period of time from the point of activating the electric kettle ton to the point where the temperature sensor records a first measurable temperature increase, i.e. the response triggering temperature increase $\Delta T_{trig}$.

During regulated heating of the electric kettle, the electronic regulator activates the heating element and measures the warm-up time $\Delta t_{warm-up}$, i.e. the time that it takes until the temperature change measured at the temperature sensor constitutes at least one response triggering temperature increase $\Delta T_{trig}$.

In order to determine a temperature gradient $m_T$ of the measured temperatures, a temperature difference $\Delta T_{1-2}$ is calculated between a temperature measurement $T_1$ at the beginning and a temperature measurement $T_2$ at the end of a sampling period of time $\Delta T_{sample}$. The sampling period of time $\Delta t_{sample}$ begins after termination of the warm-up time $\Delta t_{warm-up}$. The temperature gradient $m_T$ is determined as a function of the sampling time $\Delta T_{sample}$ and the temperature difference $\Delta T_{1-2}$. After determining the temperature gradient $m_T$, the end temperature $T_{end}$ can then be determined as a function of the temperature gradient $m_T$ and the warm-up time $\Delta t_{warm-up}$. More specifically, the end temperature $T_{end}$ can be extrapolated from the temperature gradient $m_T$ and the warm-up time $\Delta t_{warm-up}$. When the temperature sensor measures the end temperature $T_{end}$ the actual temperature of the liquid lies within an acceptable band around the target temperature $T_{target}$.

It should be noted that measurement of the gradient $m_T$ after end time $t_{end}$ is solely for the purpose of improved representation.

At the end time $t_{end}$, which is the point in time when the measured temperature of the liquid is equal to the end temperature $T_{end}$, the heating element is deactivated. While, at this point in time, the temperature sensor has not yet measured the selected target temperature $T_{target}$, the electronic regulator has already calculated the temperature gradient $m_T$ and determined the warm-up time $\Delta t_{warm-up}$. And, the end temperature $T_{end}$ has been extrapolated. Thus, it is known that the actual temperature of the liquid falls within an acceptable band around the target temperature $T_{target}$ at the end time $t_{end}$. There is no need to continue heating the liquid beyond this point. Therfore, the heating element is deactivated.

Figure 5:
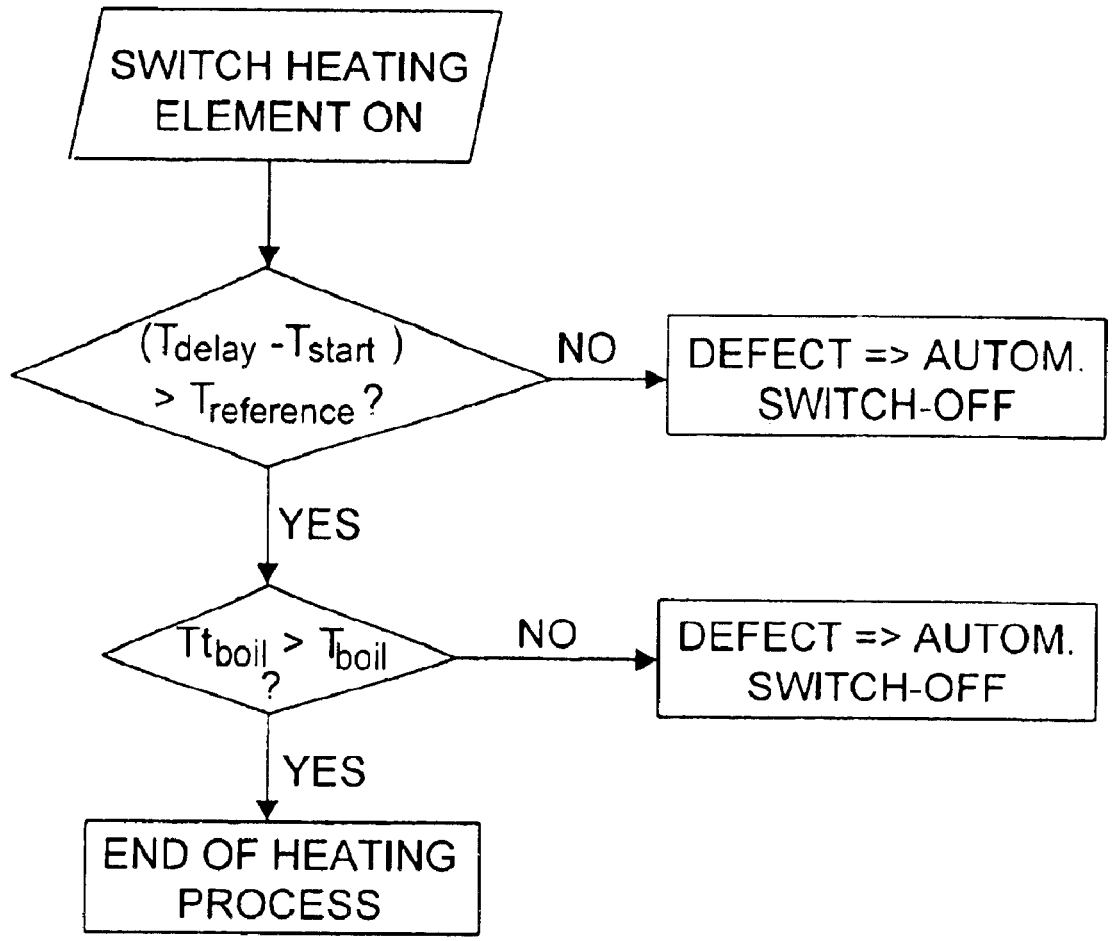
FIG. 5 is a flow chart diagrammatically showing a method for regulating the heating process of an electric kettle.
Figure 6:
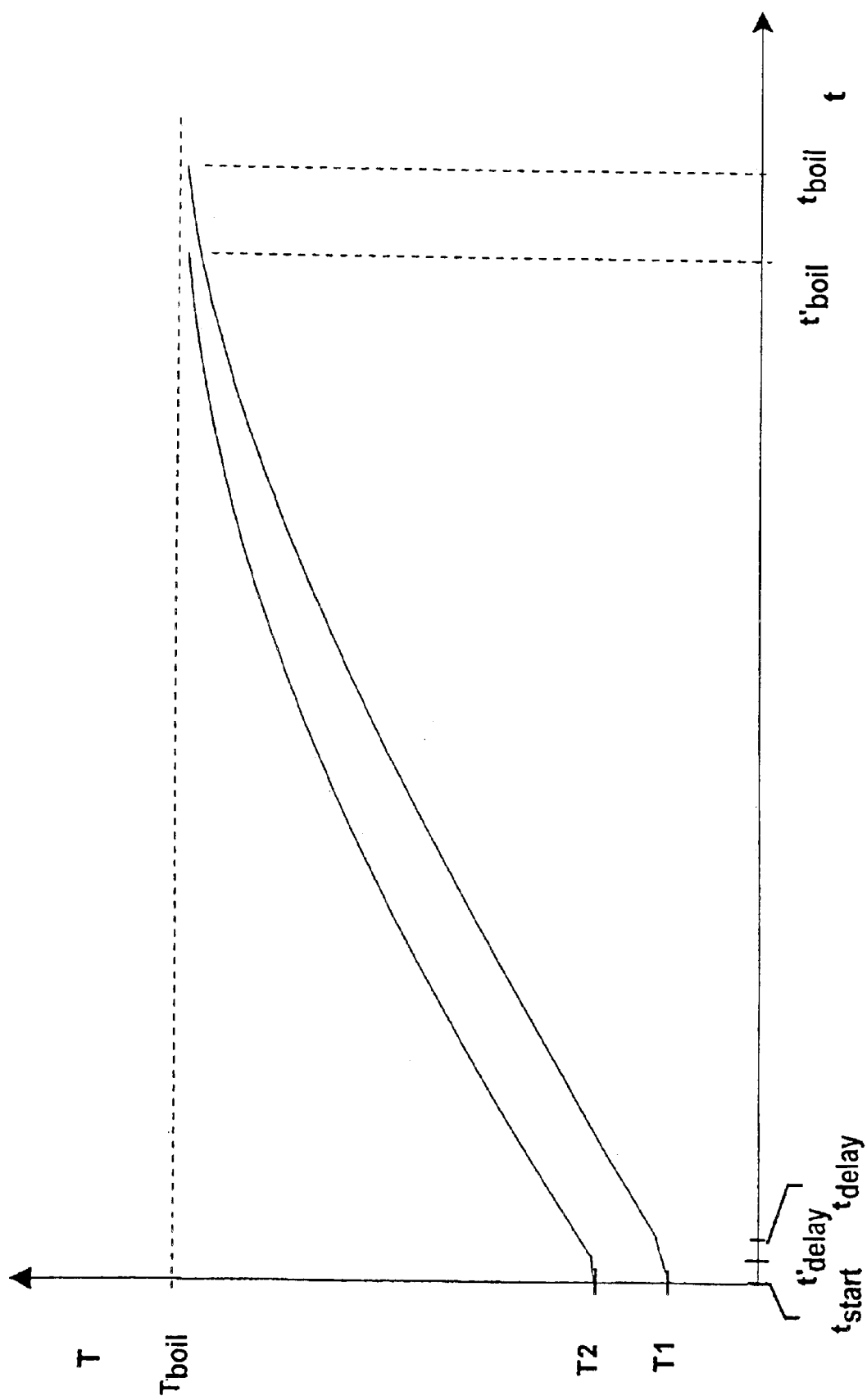
FIG. 6 is a diagram showing the temperature gradient T over the time t in the heating process of an electric kettle.

Referring to FIG. 5, the regulator comprises a non-volatile electronic memory (not shown) in which predefined characteristic data is stored for the purpose of verifying the sensor information.

In one embodiment, characteristic data including the delay time $\Delta t_{delay}$, a boiling temperature $T_{boil}$, and a boiling time $t_{boil}$ is stored in the electronic memory of the regulator. The characteristic data may also include other values.

Delay time $\Delta t_{delay}$: As noted above, there is a delay time $\Delta t_{delay}$ between activating the heating element and measuring a temperature increase. However, after this time delay, a temperature increase should be registered, even if the electric kettle has been filled to the maximum level.

If no temperature increase is registered at the delay time $\Delta t_{delay}$, it can generally be attributable to one of the two following reasons. Either the heating element is defective, or the sensor is defective. In the first case, where the heating element is defective, this merely means that the respective heating process does not take place. In the second case, however, where the sensor is defective, the malfunction can lead to overheating and a resulting failure of the appliance. Furthermore, inadvertent boiling dry of the appliance can take place, i.e. the electric kettle heats up without an adequate quantity of water being contained therein. All this can cause a fire, and/or injuries to a user.

In either case the electric kettle malfunctions. It is therefore essential in these cases that the heating element be deactivated immediately. In addition to automatic deactivation of the heating element, a malfunction signal may be emitted either acoustically or visually to inform the user of the malfunction.

Boiling temperature $T_{boil}$: The boiling temperature is calculated and stored in the memory. The boiling temperature varies with the ambient conditions, e.g. ambient temperature and ambient pressure.

Boiling time $t_{boil}$: Even with the heating device at the full liquid level and with the ambient temperature at a minimum level, the boiling time $t_{boil}$ (i.e. the time necessary for the liquid to reach its boiling point) can be determined. The boiling time $t_{boil}$ can be stored in the memory as characteristic data. If, with the heating element activated, the boiling time $t_{boil}$ has passed without the boiling temperature $T_{boil}$ having been reached, the electric kettle is automatically deactivated by the electronic regulator.

The method, shown in FIG. 1, for regulating the heating process of an electric kettle can be summarized as follows:

a) The heating element of the electric kettle is activated. This takes place by activating the on switch of the kettle.

b) A temperature increase $\Delta T_{delay}$ over a predetermined interval of delay time $\Delta t_{delay}$ is measured and recorded by the temperature sensors and the electronic regulator, respectively;

b1) If the measured temperature increase $\Delta T_{delay}$ is greater than a reference temperature increase $\Delta T_{min}$, the process of step c is initiated; and b2) If the measured temperature increase $\Delta T_{delay}$ is less than or equal to the reference temperature increase $\Delta T_{min}$, the heating element is automatically deactivated by the electronic regulator;

c) A temperature $Tt_{boil}$ is measured at the boiling time $t_{boil}$. The boiling time $t_{boil}$ is stored in the electronic memory and accessed by the regulator;

c1) If the measured temperature at the boiling time $Tt_{boil}$ is greater than or equal to the reference boiling temperature $T_{boil}$, the heating process concludes in a regular manner, i.e. the heating element is deactivated upon the liquid reaching the boiling temperature $T_{boil}$ or the target temperature $T_{target}$; and c2) If the measured temperature $Tt_{boil}$ is less than the reference boiling temperature $T_{boil}$, the heating element is automatically deactivated by the electronic regulator.

FIG. 2 shows a diagram in which the temperature of the water has been entered along a time axis. The progression of two example curves is shown. The delay time $t_{delay}$ and boiling time $t_{boil}$ are calculated in relation to an initial temperature $T_1$, of the liquid. A delay time $t'_{delay}$ and a boiling time $t'_{boil}$ are calculated in relation to a higher initial temperature $T_2$ of the liquid, as compared to the initial temperature $T_1$.

The temperature of the liquid in both cases, i.e. in the case of initial temperature $T_1$ and in the case of initial temperature $T_2$, first slightly increases in the delay time periods $\Delta t_{delay}$, $\Delta t'delay$. If there is no measurable increase in temperature during this period, there can be several reasons for this. On the one hand, the heating element may be defective, i.e. the water is indeed not being heated up. On the other hand, the temperature sensor may be defective, i.e. the water is being heated up, but the changed state is not being registered by the sensor equipment.

While in the first case there is an obvious defect, the defect in the second case can have much more serious consequences. Since no temperature information is being registered, there is no longer any regulation. This can cause overheating, running dry, or even a fire. Therefore, according to some embodiments, immediate deactivation of the electric kettle is provided in both cases. In addition, the defect is signaled either visually or acoustically.

If no defect occurs during the delay time period $\Delta t_{delay}$, then the temperature curves rise steadily until they reach the boiling temperature $T_{boil}$. If the temperature curves reach the boiling temperature $T_{boil}$ at the boiling time $t_{boil}$ (for an initial temperature $T_1$) or at the boiling time $t'_{boil}$ (for an initial temperature $T_2$), then the heating process is ended in a regular manner, i.e. the heating element is deactivated upon the boiling temperature $T_{boil}$ or target temperature $T_{target}$ being reached.

If, at the boiling time $t_{boil}$ or $t'_{boil}$, the temperature is less than the boiling temperature $T_{boil}$, then the device is immediately deactivated and the user is informed of the defect by way of visual or acoustic devices. Failing to reach the boiling temperature $T_{boil}$ at the boiling time $t_{boil}$, $t'_{boil}$ may indicate that either the output of the heating element is insufficient to heat the liquid to boiling temperature (this may for example be the case if the heating element is furred up by calcium deposit or is otherwise damaged), or the sensor does not supply reliable temperature information (this may for example be the case if a loose contact interrupts the signal line, if the sensor is incorrectly calibrated, or if the sensor has failed altogether).

A number of embodiments of the invention have been described. Nevertheless, it will be understood that various modifications may be made without departing from the spirit and scope of the invention.

What is claimed is:

1. A method of heating a liquid in an electric kettle having a heating element, a temperature sensor, and an electronic regulator, the method comprising:

sensing a starting temperature at the temperature sensor;

determining a starting temperature differential between the measured starting temperature and a preselected target temperature;

in response to the starting temperature differential being equal to a reference temperature differential, heating the kettle at less than a full power level for a calculated period of time; and in response to the starting temperature differential being greater than the reference temperature differential, determining an end temperature and heating the kettle until the determined end temperature is sensed at the temperature sensor.

2. The method of claim 1, further comprising determining a heat capacity.

3. The method of claim 2, wherein determining the heat capacity comprises activating the heating element for a predetermined amount of time and then deactivating the heating element, and wherein the heat capacity is a function of a heating output applied by the activated heating element and a measured temperature differential over a predetermined time after the heating element is activated.

4. The method of claim 2, wherein the reference temperature differential is calculated as a function of the heat capacity, an electrical heating output of the heating element, and a delay time, the delay time being an amount of time, after activation of the heating element, that passes before a temperature increase is sensed at the temperature sensor.

5. The method of claim 4, wherein the reference temperature differential is a product of the electrical heating output and the delay time, divided by the heat capacity.

6. The method of claim 1, wherein the determined end temperature is less than the preselected target temperature.

7. The method of claim 1, wherein the starting temperature differential is divided into multiple increments, the number of regions being dependent upon the temperature differential.

8. The method of claim 1, wherein, in response to the starting temperature differential being equal to the reference temperature differential, the kettle is heated at less than a full power level for a calculated period of time such that, upon a first measurable temperature increase, a measured temperature at the temperature sensor is less than the determined end temperature.

9. The method of claim 1, wherein, heating the kettle at less than the full power level comprises intermittently activating and deactivating the heating element.

10. The method of claim 9, wherein activating the heating element comprises heating the kettle at the full power level and deactivating the heating element comprises not heating the kettle.

11. The method of claim 1, wherein the heating element includes multiple heating units, and wherein heating the kettle at less than the full power level comprises deactivating at least one of the multiple heating units.

12. The method of claim 4, wherein the kettle is constructed such that the delay time is approximately equal to a time difference between the liquid actually reaching the determined end temperature and the determined end temperature being sensed at the temperature sensor.

13. The method of claim 1, further comprising determining a sampling temperature difference between a beginning and an end of a sampling time period, the sampling time period occurring after a delay time, the delay time being an amount of time, after activation of the heating element, that passes before a temperature increase is sensed.

14. The method of claim 13, further comprising determining a temperature gradient as a function of the sampling time period and the sampling temperature difference.

15. The method of claim 14, wherein determining the end temperature comprises extrapolating a temperature curve based on the delay time and the temperature gradient.

16. An electric kettle for heating a liquid, the kettle comprising:

a container defining a cavity for containing the liquid;

a heating element that transmits heat to the liquid;

a temperature sensor responsive to a kettle temperature;

a time sensor; and a heating regulator configured to, upon activation of the kettle, sense a starting temperature measured by the temperature sensor;

determine a starting temperature differential between the measured starting temperature and a preselected target temperature;

heat the kettle at less than a full power level for a calculated period of time in response to the starting temperature differential being equal to a reference temperature differential; and determine an end temperature and heat the kettle until the determined end temperature is measured at the temperature sensor in response to the starting temperature differential being greater than the reference temperature differential.

17. The electric kettle of claim 16, wherein the heating regulator is further configured to determine a heat capacity, the heat capacity being a function of a heating output applied by the heating element and a measured temperature differential over a period of time after the heating element is activated.

18. The electric kettle of claim 16, wherein the heating regulator is further configured to determine a delay time, the delay time being the amount of time, after activation of the heating element, that passes before a temperature increase is measured at the temperature sensor.

19. The electric kettle of claim 16, wherein the heating element includes multiple heating units.

20. A method of detecting a malfunction in an electric kettle for heating a liquid, the kettle including a heating element, a temperature sensor, a heating regulator, and an electronic memory, the method comprising:

sensing a starting temperature at the temperature sensor;

activating the heating element for a selected length of time;

sensing a second temperature at the temperature sensor at the end of the selected length of time;

calculating a temperature differential as a difference between the starting temperature and the second temperature; and in response to the calculated temperature differential being less than or equal to a reference temperature differential, deactivating the heating element.

21. The method of claim 20, further comprising:

in response to the calculated temperature differential being greater than the reference temperature differential, sensing a third temperature at the temperature sensor at a reference boiling time;

in response to the third temperature being less than a reference boiling temperature, deactivating the heating element; and in response to the third temperature being greater than or equal to the reference boiling temperature, deactivating the heating element.

22. The method of claim 21, further comprising determining the selected length of time, the reference temperature differential, the reference boiling time, and the reference boiling temperature as functions of an ambient temperature.

23. The method of claim 22, wherein determining the selected length of time, the reference temperature differential, the reference boiling time, and the reference boiling temperature comprises accessing data of a characteristic data matrix stored in the electronic memory.

24. The method of claim 21, further comprising indicating a malfunction if the calculated temperature increase is less than or equal to the reference temperature increase and if the third temperature is less than the reference boiling temperature.

25. The method of claim 24, wherein indicating the malfunction comprises activating an acoustic indicator.

26. The method of claim 21, further comprising measuring a liquid fill level prior to activating the heating element.

27. The method of claim 26, wherein the selected length of time, the reference temperature differential, the reference boiling time, and the reference boiling temperature are functions of the measured liquid fill level.

28. The method of claim 23, further comprising modifying the data of the characteristic data matrix in response to the third temperature being greater than or equal to the reference boiling temperature.

29. The method of claim 28, further comprising determining a power consumption of the heating element over time and a temperature gradient of the liquid over time.

30. The method of claim 21, further comprising storing system errors, wherein, in response to the system errors occurring above a predetermined acceptable frequency, the heating element is deactivated until a memory is reset.

31. The method of claim 30, wherein the system errors include calculating the temperature differential to be less than or equal to the reference temperature differential and sensing the third temperature to be less than the reference boiling temperature.

32. An electric kettle for heating a liquid, the kettle comprising:
   a heating element that transmits heat to the liquid;
   a temperature sensor responsive to a kettle temperature;
   a time sensor;
   an electronic memory that stores characteristic data; and
   a heating regulator in communication with the memory, the heating regulator configured to sense a starting temperature measured by the temperature sensor;
   activate the heating element for a selected length of time;
   sense a second temperature measured by the temperature sensor at the end of the selected length of time;
   calculate a temperature differential as a difference between the starting temperature and the second temperature; and
   deactivate the heating element in response to the calculated temperature differential being less than or equal to the reference temperature differential.

33. The electric kettle of claim 32, wherein the heating regulator is further configured to
   sense a third temperature measured by the temperature sensor at a reference boiling time in response to the calculated temperature differential being greater than the reference temperature differential;
   deactivate the heating element in response to the third temperature being less than a reference boiling temperature; and
   deactivate the heating element in response to the third temperature being greater than or equal to the reference boiling temperature.

34. The electric kettle of claim 33, wherein the memory comprises a characteristic data matrix including data corresponding to the selected length of time data, the reference temperature differential, the reference boiling time, and the reference boiling temperature.

35. The electric kettle of claim 34, further comprising a microprocessor that updates the characteristic data in response to a system change.

36. The electric kettle of claim 35, wherein the system change is a decrease in heating output of the heating element.

37. The electric kettle of claim 32, further comprising an indicator to indicate a malfunction to a user.

38. The electric kettle of claim 37, wherein the indicator is an acoustic indicator.

39. The electric kettle of claim 32, further comprising a liquid level sensor that measures a level of the liquid in the kettle.

40. The electric kettle of claim 32, wherein the heating regulator is further configured to deactivate the heating element until the memory is reset in response to system errors occurring above a predetermined acceptable frequency.

* * * * *